United States Patent
Eto et al.

(10) Patent No.: US 7,751,288 B2
(45) Date of Patent: Jul. 6, 2010

(54) ADJUSTMENT METHOD OF OPTIMUM WRITE POWER AND OPTICAL WRITE/RETRIEVAL DEVICE

(75) Inventors: Soichiro Eto, Tokyo (JP); Koichi Watanabe, Hachioji (JP); Takahiro Kurokawa, Fujisawa (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 816 days.

(21) Appl. No.: 11/704,352

(22) Filed: Feb. 9, 2007

(65) Prior Publication Data

US 2007/0286042 A1   Dec. 13, 2007

(30) Foreign Application Priority Data

Jun. 12, 2006 (JP) ............................. 2006-161784

(51) Int. Cl.
G11B 15/52 (2006.01)
(52) U.S. Cl. .................. 369/47.53; 369/53.27
(58) Field of Classification Search ................ None
See application file for complete search history.

(56) References Cited

U.S. PATENT DOCUMENTS

| | | | |
|---|---|---|---|
| 2002/0085463 A1* | 7/2002 | Minemura et al. | 369/47.53 |
| 2005/0088953 A1* | 4/2005 | Kurokawa et al. | 369/116 |
| 2005/0099913 A1* | 5/2005 | Suzuki | 369/47.53 |
| 2005/0195724 A1* | 9/2005 | Mamiya et al. | 369/116 |
| 2006/0126467 A1* | 6/2006 | Roh et al. | 369/47.53 |

FOREIGN PATENT DOCUMENTS

| JP | 2002-298357 | 10/2002 |
|---|---|---|
| JP | 2005-149538 | 6/2005 |

* cited by examiner

*Primary Examiner*—Paul Huber
(74) *Attorney, Agent, or Firm*—Antonelli, Terry, Stout & Kraus, LLP.

(57) ABSTRACT

A write power adjustment method and optical read/write apparatus for accurate optimum write power setup. Different levels of write power Pwm are used to perform a test write and calculate a modulation Mm corresponding to each level of write power Pwm. Different write power compensated values Pcn are used to calculate an evaluated value $Smn = Mm \times (Pwm - Pcn)$. Pcn that maximizes the linearity of the relationship between compensated write power (Pwm−Pcn) and evaluated value Smn is determined as an optimum write power compensated value Pc0. Compensated write power Pth0 that provides a modulation of zero, that is, an evaluated value Sm0 of zero, when the relationship between compensated write power (Pwm−Pc0) for Pc0 and evaluated value Sm0 is subjected to linear approximation is determined. Pth0 and optimum write power compensated value Pc0 are used to calculate a write power threshold $Pth = Pth0 + Pc0$. A predetermined calculation is performed on Pth to determine optimum write power Popt. In contrast to a conventional write power adjustment method (κ method), the present invention makes it possible to accurately adjust for the optimum write power even when the optical disc's write power Pwm-to-evaluated value M×Pw relationship is not linear or its modulation M varies.

15 Claims, 8 Drawing Sheets

US 7,751,288 B2

ADJUSTMENT METHOD OF OPTIMUM WRITE POWER AND OPTICAL WRITE/RETRIEVAL DEVICE

CLAIM OF PRIORITY

The present application claims priority from Japanese application JP 2006-161784 filed on Jun. 12, 2006, the content of which is hereby incorporated by reference into this application.

CROSS-REFERENCE TO RELATED APPLICATIONS

This application is related to U.S. application Ser. No. 11/429,442 filed on May 8, 2006 and Ser. No. 11/503,998 filed on Aug. 15, 2006, the disclosures of which are hereby incorporated by reference.

FIELD OF THE INVENTION

The present invention relates to a write power adjustment method and optical read/write apparatus, and more particularly to a method for making write power adjustments in accordance with the relationship between write power and modulation and to an optical read/write apparatus having a section that makes write power adjustments in accordance with the relationship between write power and modulation.

BACKGROUND OF THE INVENTION

At present, a CD (Compact Disc), a DVD (Digital Versatile Disc), and other optical discs (information recording media) are commercialized and widespread. In recent years, a BD (Blu-ray Disc) has begun to be commercialized as a large-capacity next-generation optical disc. There are various types of BDs, including a BD-ROM (ROM type optical disc), which is a read-only disc; a BD-RE (rewritable or RW type optical disc), which is rewritable; and a BD-R (recordable or R type optical disc), which is a write-once disc. As regards rewritable (BD-RE) and recordable (BD-R) discs, the optimum write power used for a write operation varies from one disc type to another and from one manufacturer to another. Therefore, optical drives (optical read/write apparatuses) need to set optimum write power for each optical disc. However, output write power varies from one drive to another. Therefore, the employed write power setting varies so that satisfactory write operations may not always be performed. Consequently, each drive is configured to perform a test write in a predetermined region of each optical disc and adjust for optimum write power for each optical disc.

As regards the BD-RE and BD-R optical discs, the associated written standard states the use of a write power adjustment method (κ method), which uses predetermined write power Ptarget specific to each medium, predetermined modulation Mind, and parameters κ and ρ. This write power adjustment method, which is based on the κ method, adjusts for the optimum write power in accordance with the relationship between the write power obtained by a test write and the modulation derived from the read signal amplitude of the signal of the write power, and the Ptarget, Mind, κ, and ρ values predetermined for the optical disc.

The BD-RE/BD-R written standard also states the use of a linear fit method, which belongs to the κ method category. The linear fit method first notes the relationship between a plurality of write power levels Pwm set for a test write and the modulation Mm derived from the read signal amplitude of a signal written at each write power level Pwm, then determines an evaluated value Sm=Mm×Pwm within a range close to the predetermined write power Ptarget corresponding to the predetermined modulation Mind for the optical disc and to the predetermined modulation Mind, determines the write power threshold Pth that provides a modulation of zero when the relationship between Pwm and Sm is subjected to linear approximation within the above range, and performs calculations (Popt=κ×ρ×Pth) to determine the optimum write power Popt from the determined Pth value and the parameters κ and ρ for the optical disc.

When the above κ method is used to adjust for the optimum write power, it is possible to minimize the output write power variation among various drives.

SUMMARY OF THE INVENTION

However, the write power setting varies not only because the output power varies from one drive to another.

Even in a region close to the predetermined write power Ptarget, the optimum write power may not be accurately determined because the relationship between the write power Pwm and evaluated value Mm×Pwm may not become linear depending on the employed optical disc.

FIG. 9 in Japanese Patent JP-A No. 298357/2002 shows the characteristics relationship between the write power Pwm and evaluated value Mm×Pwm of an optical disc whose optimum write power Popt can be accurately determined by the conventional κ method. The characteristics relationship between Pwm and Mm×Pwm of such an optical disc is linear. Therefore, it is always possible to uniquely determine the write power threshold Pth that provides a modulation M of zero, that is, an evaluated value Mm×Pwm of zero, when linear approximation is performed near the predetermined write power Ptarget corresponding to the predetermined modulation Mind read from the optical disc. Consequently, it is possible to uniquely determine the optimum write power Popt, which is calculated from the determined write power threshold Pth.

FIG. 1 shows the relationship between Pwm and Mm×Pwm of an optical disc whose optimum write power Popt cannot be accurately determined by the conventional κ method. When linear approximation is performed near the predetermined write power Ptarget corresponding to the predetermined modulation Mind, the characteristics relationship shown in FIG. 1 indicates that the approximation straight line gradient and Pw intercept (=Pth) vary depending on the range over which the linear approximation is performed. In an example shown in FIG. 2, the variation of the write power threshold Pth that is determined when the write power for the optical disc is adjusted 100 times by the conventional κ method is indicated by the amounts of changes from the average Pth value and the frequency of such changes. As indicated in FIG. 2, the linear approximation range varies during write power adjustments. Therefore, the write power threshold Pth to be determined greatly varies. As a result, the optimum write power Popt, which is calculated from the write power threshold Pth that greatly varies, also varies greatly. Consequently, it is difficult to accurately determine the optimum write power for an optical disc whose Pwm-to-Mm×Pwm relationship is not linear.

Further, as regards an optical disc whose Pwm-to-Mm×Pwm relationship is as indicated in FIG. 9 of Japanese Patent JP-A No. 298357/2002 or FIG. 1, it is found that the reflected light intensity varies to greatly vary the modulation depending on whether a nontarget layer, for instance, of a dual-layer optical disc, is unwritten or written.

FIG. 3 schematically shows how the modulation varies. A high envelope (Henv) and low envelope (Lenv) of a read signal are used to give the modulation M=(Henv−Lenv)/Henv. Therefore, when the state changes from state (a) to state (b) as indicated in FIG. 3, the maximum value Henv varies although (Henv−Lenv) does not vary. Thus, the modulation M varies.

FIG. 4 shows the Pwm-to-Mm relationships that prevail in state (a) and state (b) when the above problem occurs in relation to an optical disc having the characteristics relationship shown in FIG. 1. FIG. 5 shows the Pwm-to-Pwm×Mm relationships prevailing in state (a) and state (b) and the optimum write power that is determined from the indicated relationships. As shown in FIG. 4, the predetermined write power Ptarget corresponding to the predetermined modulation Mind varies depending on whether state (a) or state (b) prevails. Therefore, as indicated in FIG. 5, linear approximation is performed over a range that varies depending on whether state (a) or state (b) prevails. Consequently, the determined write power threshold Pth also varies depending on whether state (a) or state (b) prevails. An example shown in FIG. 6 indicates the variation and frequency of the write power threshold Pth that is determined when the write power is adjusted 100 times by the conventional κ method in state (a) and state (b) of the optical disc. The difference between state (a) and state (b) arises from intensity changes in the light reflected from a nontarget layer. By nature, the optimum write power Popt, that is, the write power threshold Pth, should remain unchanged no matter whether state (a) or state (b) prevails. In reality, however, the write power threshold Pth greatly varies depending on whether state (a) or state (b) prevails, as shown in FIG. 6. Consequently, when the modulation varies as indicated in FIG. 3, it is difficult to accurately adjust for the optimum write power by the conventional κ method.

The present invention provides a method for accurately determining the optimum write power Popt for an optical disc even when it has the above problem.

To solve the above problem, the present invention writes a predetermined signal at a plurality of different write power levels Pwm (m is an integer), calculates the modulation Mm corresponding to each write power level Pwm from a read signal of the written signal, calculates the evaluated value Smn=Mm×(Pwm−Pcn) by using a plurality of different write power compensated values Pcn, determines the optimum write power compensated value PcO from the relationship between the compensated write power (Pwm−Pcn) and evaluated value Smn, calculates the compensated write power PthO that provides a modulation of zero, that is, an evaluated value SmO of zero, when the relationship between (Pwm−PcO), which is based on the determined PcO, and SmO is subjected to linear approximation, calculates the write power threshold Pth=PthO+PcO from the determined PthO and the PcO, and determines the optimum write power Popt by performing a predetermined calculation on the determined Pth.

The write power adjustment method according to the present invention will be described in detail below. For explanation purposes, an optical disc is employed as an information recording medium. However, the present invention is not limited to the use of an optical disc. The present invention can be applied to any information recording medium as far as it is irradiated with light for recording purposes.

A signal having a predetermined pattern is written in a predetermined region of an optical disc at a plurality of different write power levels Pwm. The signal written at each write power level Pwm is read to measure the Henv and Lenv of the read signal amplitude, and calculations are performed to determine the modulation Mm=(Henv−Lenv)/Henv corresponding to each Pwm value. The evaluated value Smn=Mm×(Pwm−Pcn) is calculated from a plurality of different write power compensated values Pcn (n is an integer), the write power Pwm, and the modulation Mm. The relationship between the compensated write power (Pwm−Pcn) at each Pcn value and evaluated value Smn is examined to determine the Pcn that maximizes the linearity of the relationship between (Pwm−Pcn) and Smn, as the optimum write power compensated value PcO. The relationship between (Pwm−PcO) at the determined PcO value and SmO is subjected to linear approximation, and the compensated write power PthO that provides a modulation of zero, that is, an evaluated value SmO of zero, is determined. The determined PthO and the PcO are used to determine the write power threshold Pth that satisfies the equation Pth=PthO+PcO. The determined Pth value is, for instance, multiplied by the ratio α between Popt and Pth, which is set for each optical disc, to determine the optimum write power Popt. The determined Popt value is then used to perform a write on the optical disc.

FIG. 7 shows the amounts of changes from the average Pth value and the frequency of such changes in order to illustrate the variation of the write power threshold Pth, which is determined when the write power is adjusted 100 times for the same optical disc as shown in FIG. 2 by the above method. FIG. 8 shows the variation and frequency of the write power threshold Pth that is determined when the write power is adjusted 100 times by the above method for an optical disc having the same modulation variation as shown in FIG. 6. As indicated in FIGS. 7 and 8, the use of the present invention significantly reduces the variation of the write power threshold Pth and makes it possible to always determine the proper Pth value in spite of the modulation variation.

In contrast to the conventional write power adjustment method (κ method), the present invention makes it possible to accurately adjust for the optimum write power even when the optical disc's write power Pw-to-evaluated value M×Pw relationship is not linear or its modulation M varies.

Figure 1:
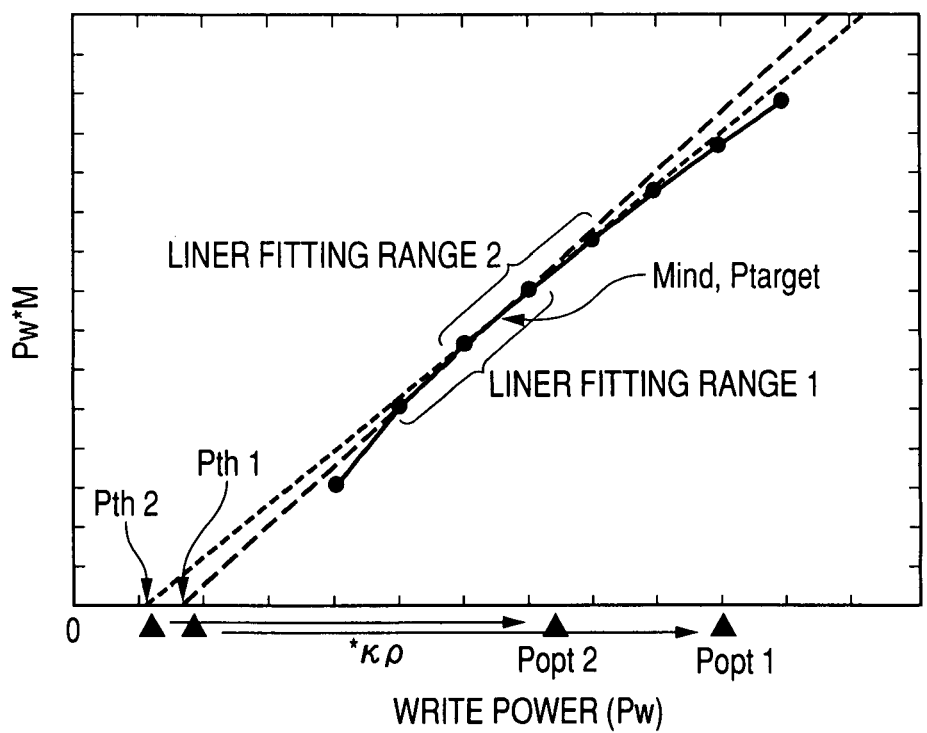
FIG. 1 shows a typical relationship between write power Pwm and evaluated value M×Pw of an optical disc whose write power cannot be accurately adjusted by a conventional κ method. The figure also shows the results of determining a write power threshold Pth and optimum write power Popt based on Pth by the conventional κ method. Linear approximation ranges 1 and 2 in the figure represent measurement point ranges that are used to determine the write power threshold Pth during the uses of linear approximation ranges 1 and 2.
Figure 2:
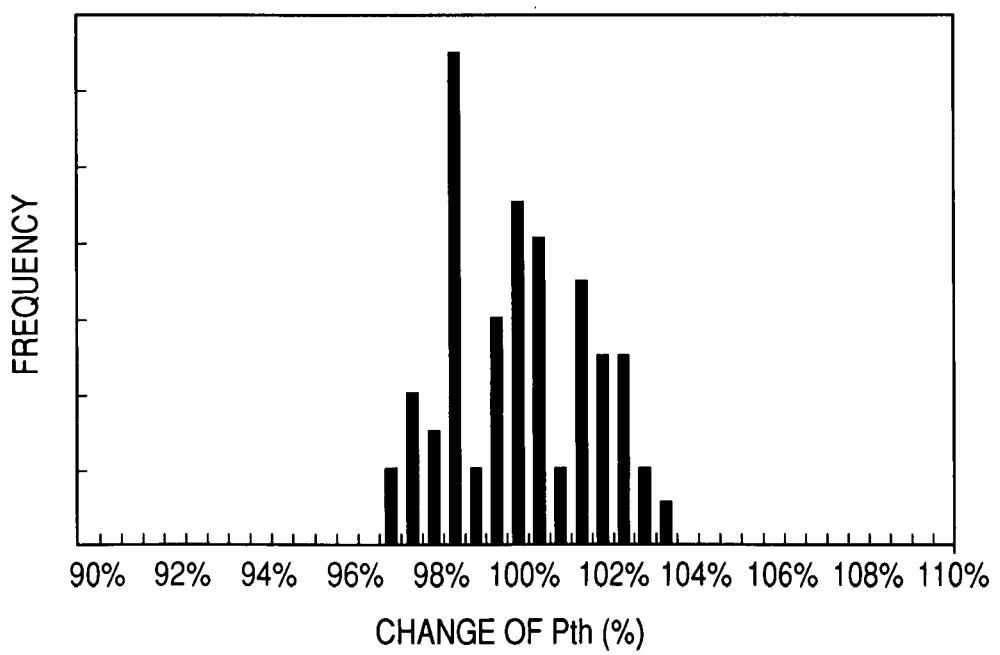
FIG. 2 shows an example in which the variation of a write power threshold Pth that is determined when the write power for an optical disc having relationship characteristics shown in FIG. 1 is adjusted 100 times by the conventional κ method is indicated by the amounts of changes from an average Pth value and the frequency of such changes.
Figure 3:
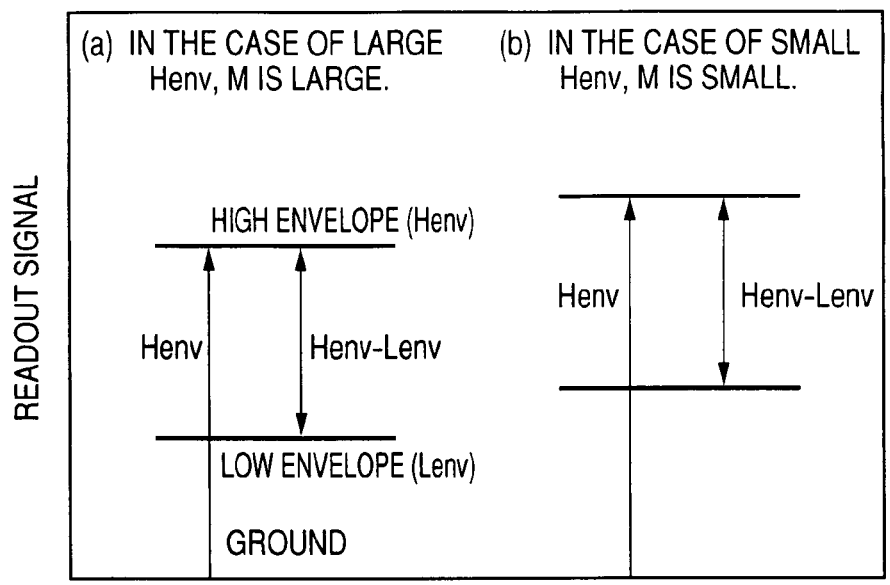
FIG. 3 schematically shows modulation variation in which a high envelope (Henv) varies.
Figure 4:
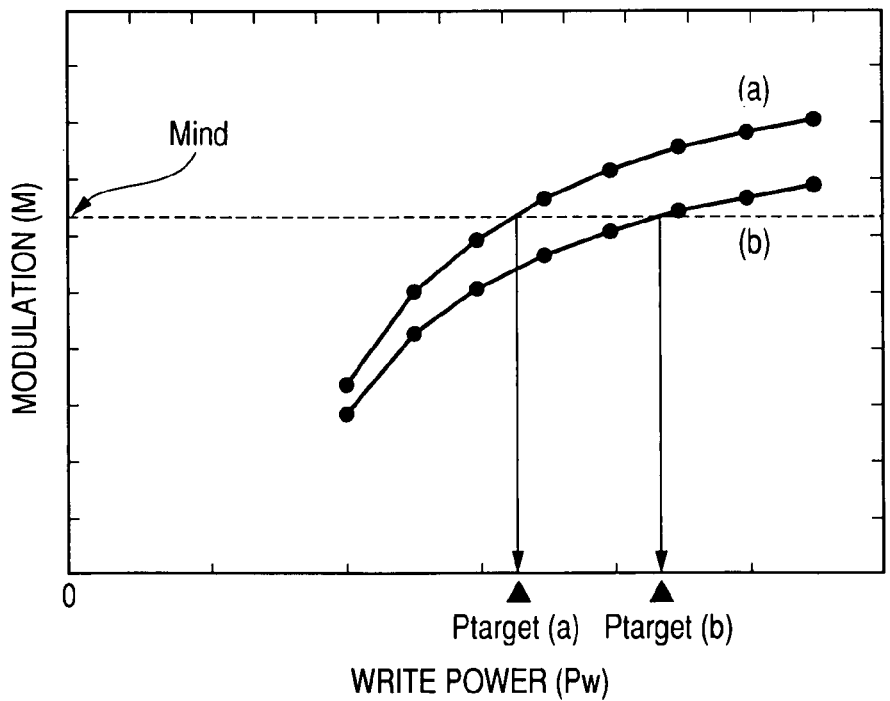
FIG. 4 shows typical relationships between write power Pw and modulation M that prevail in states (a) and (b) in which the modulation variation shown in FIG. 3 occurs on an optical disc having the relationship characteristics shown in FIG. 1. The figure also shows target write power Ptarget that is determined in states (a) and (b)
Figure 5:
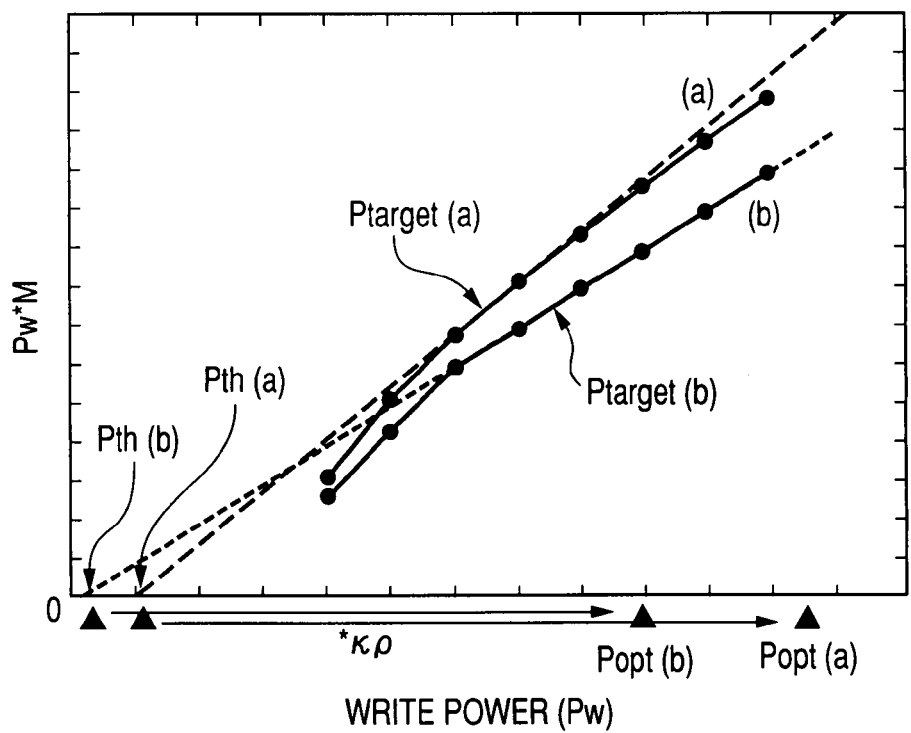
FIG. 5 shows typical relationships between write power Pw and evaluated value M×Pw that prevail in states (a) and (b)
Figure 6:
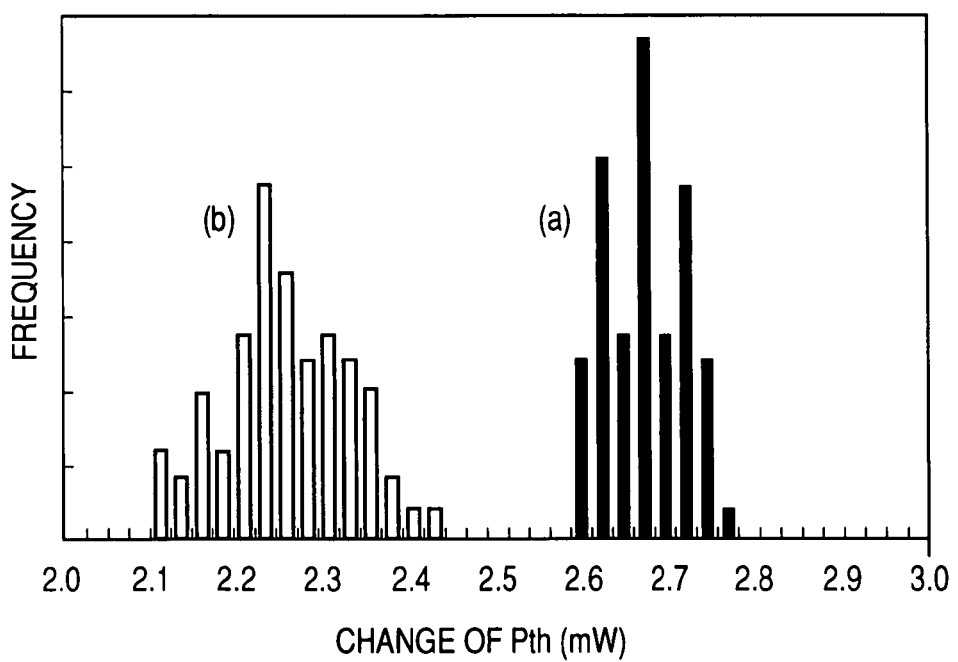
Figure 7:
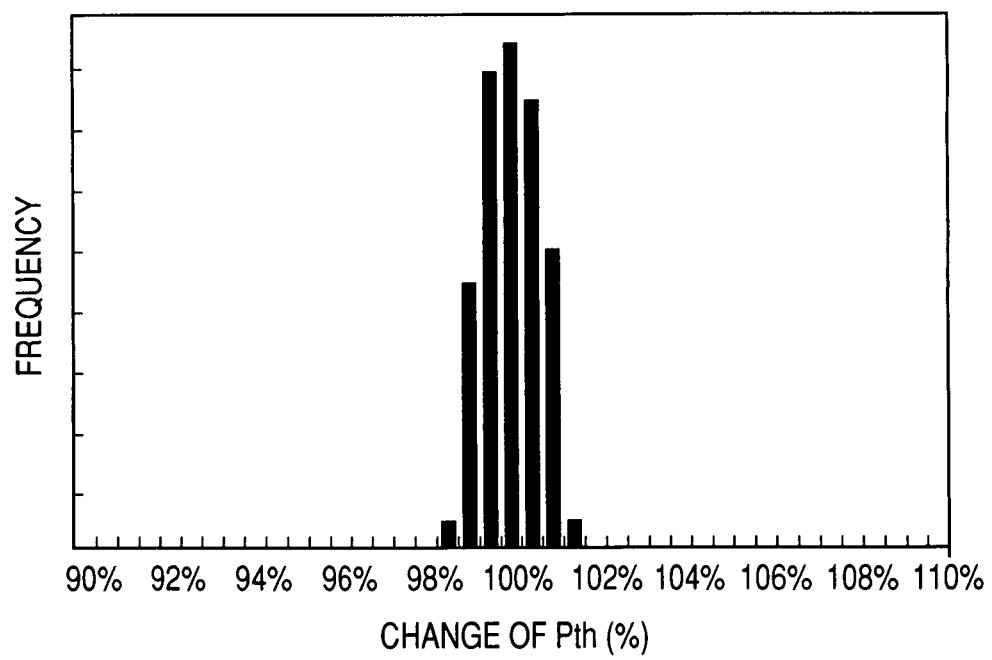
Figure 8:
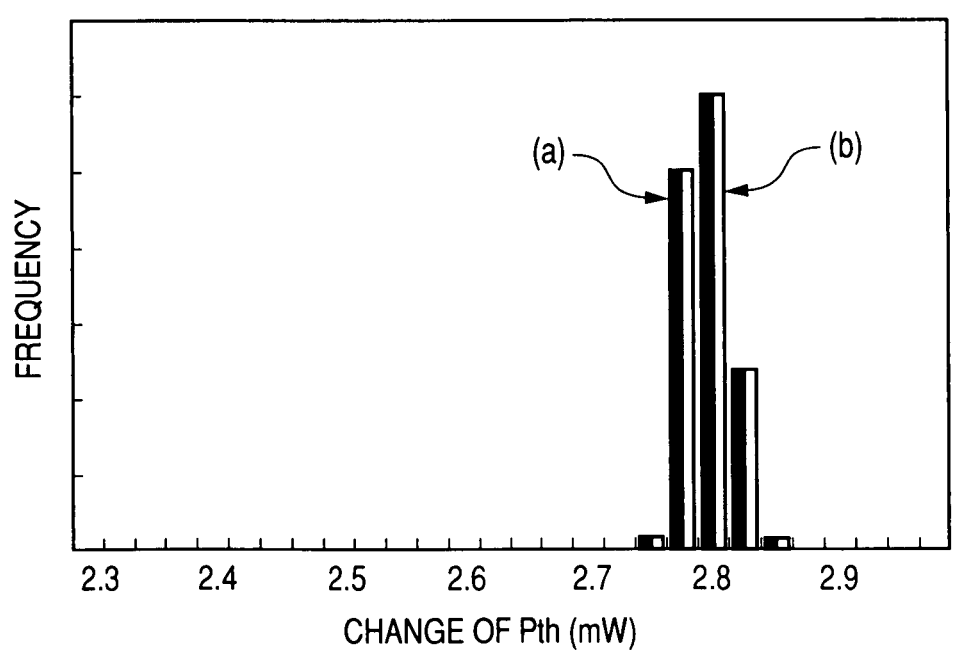
Figure 9:
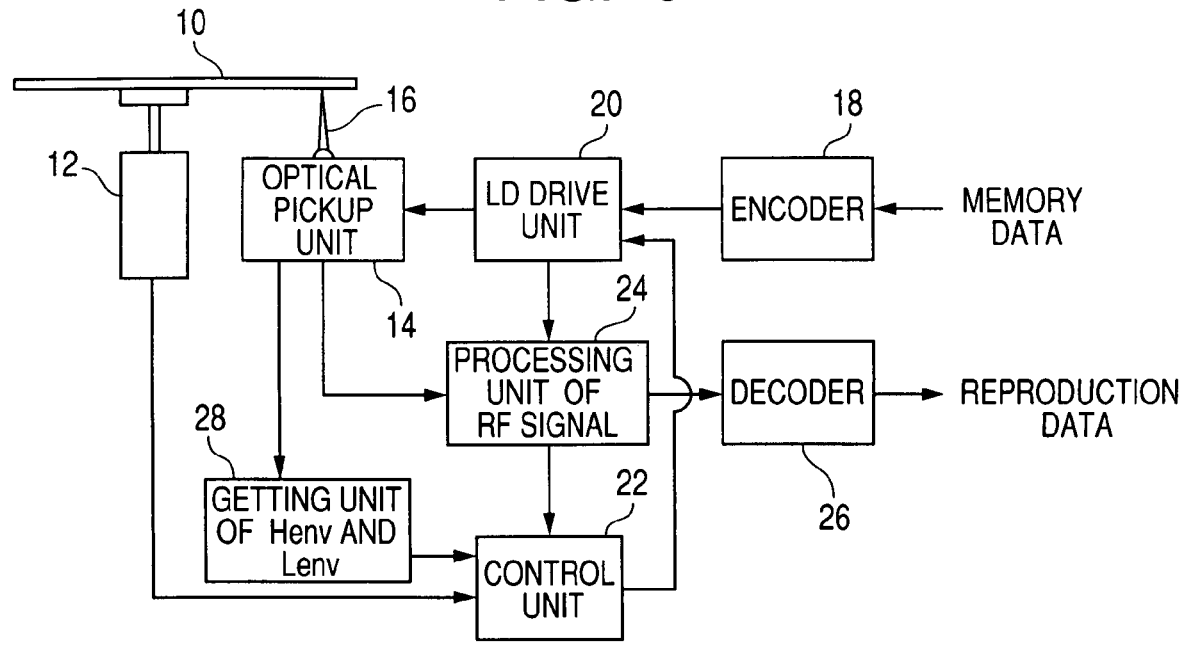
Figure 10:
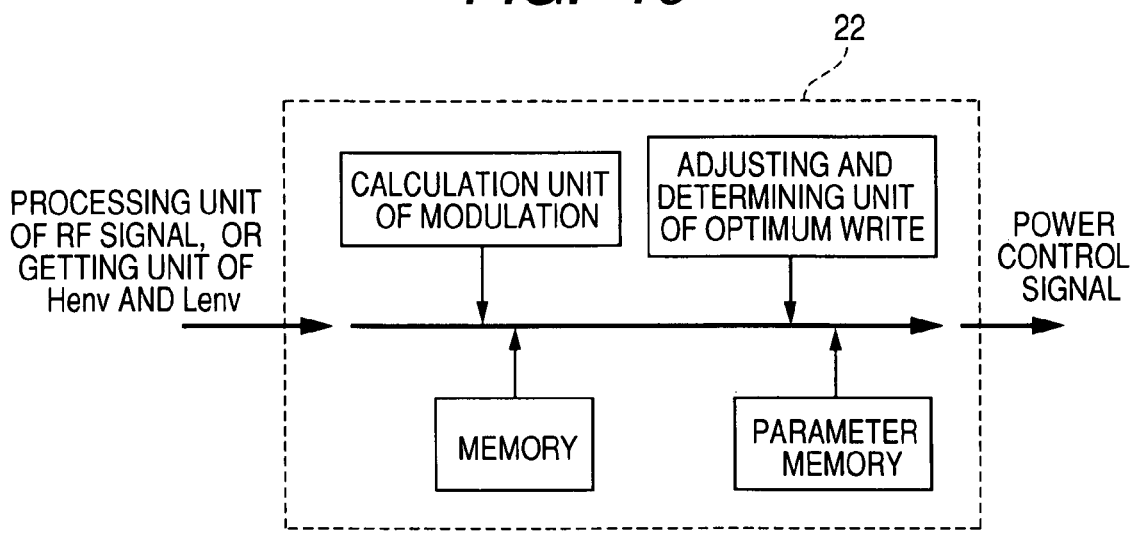
Figure 11:
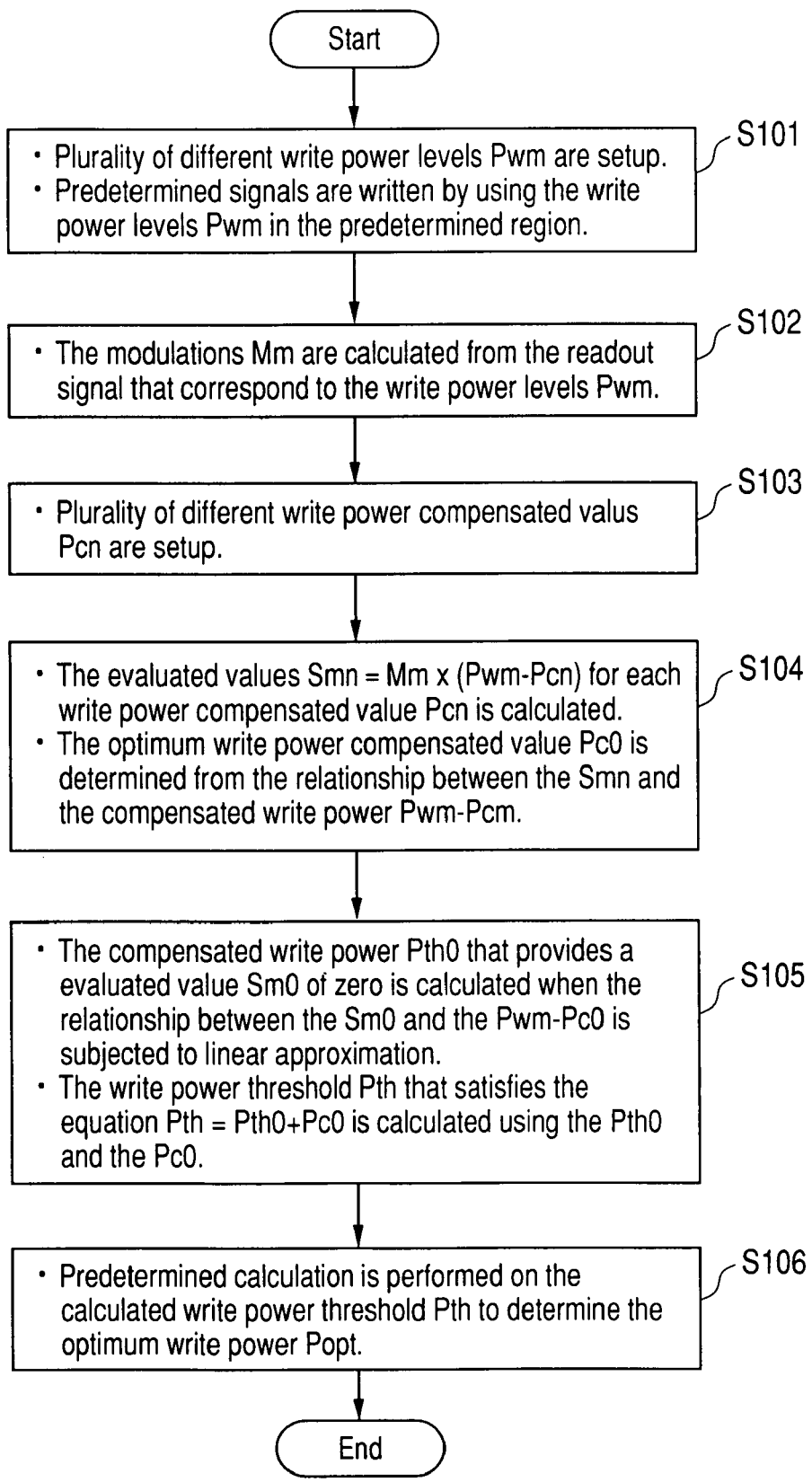
Figure 12:
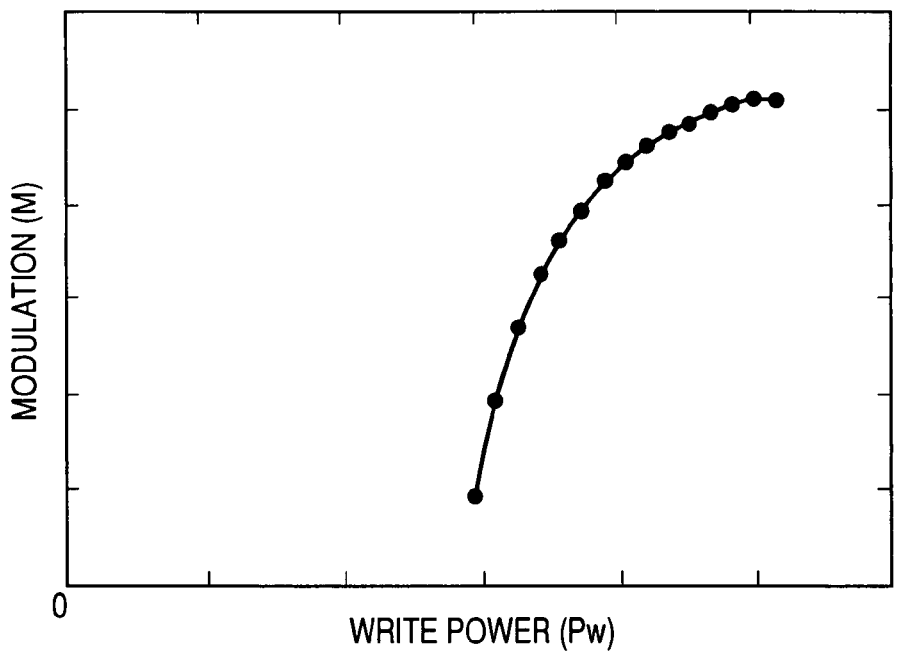
Figure 13:
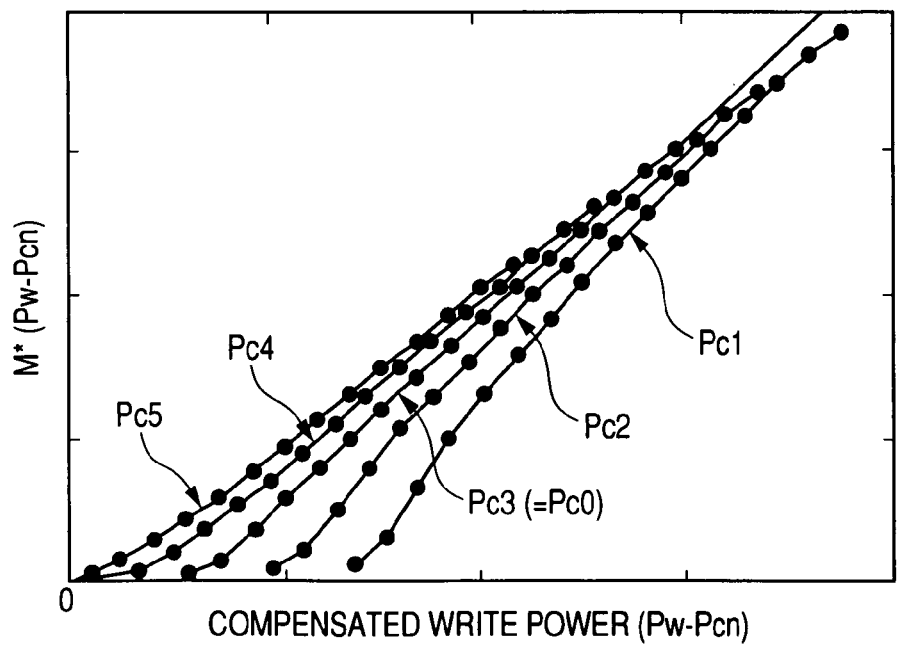
Figure 14:
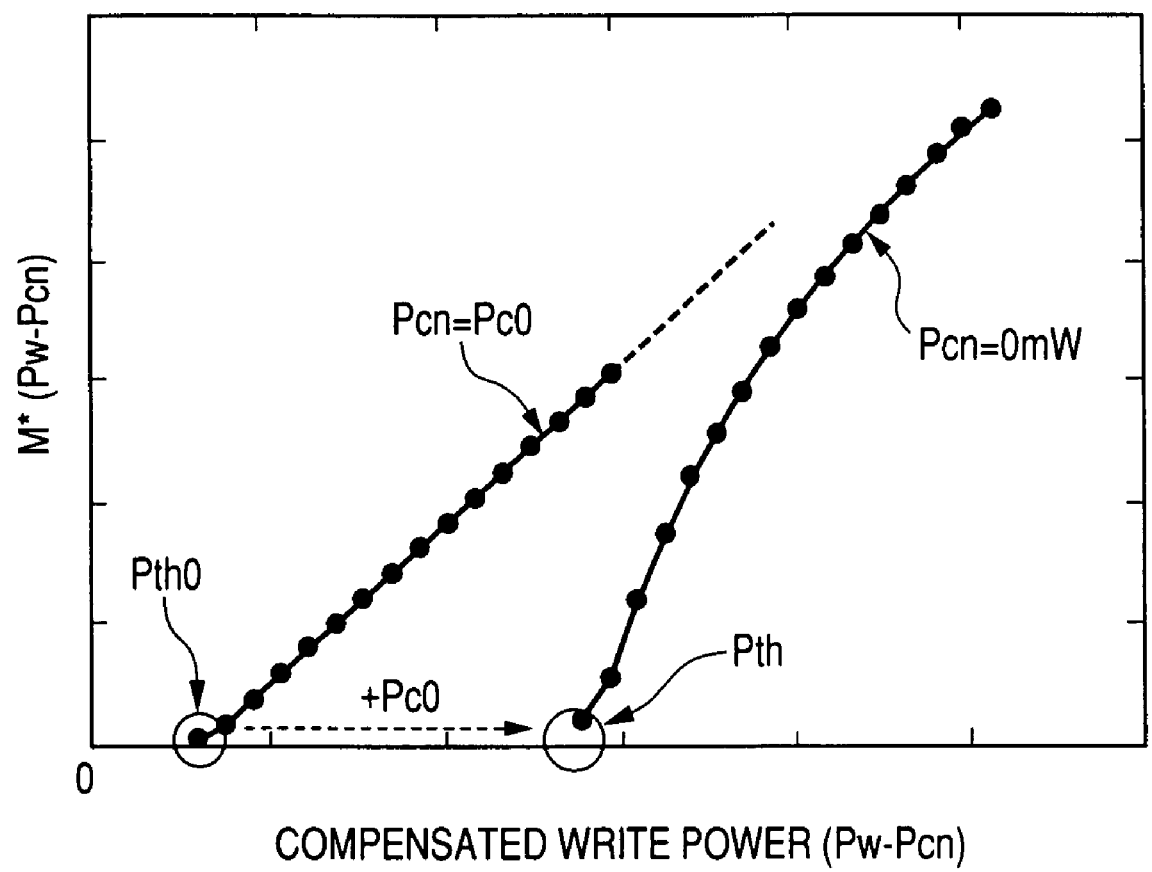

in which the modulation variation shown in FIG. 3 occurs on an optical disc having the relationship characteristics shown in FIG. 1. The figure also shows a write power threshold Pth and optimum write power Popt that are determined in states (a) and (b) by the conventional κ method;

FIG. 6 shows an example to indicate the variation and frequency of a write power threshold Pth that is determined when the write power is adjusted 100 times by the conventional κ method in states (a) and (b) in which the modulation variation shown in FIG. 3 occurs on an optical disc having relationship characteristics shown in FIG. 1;

FIG. 7 shows an example in which the variation of a write power threshold Pth that is determined when the write power for an optical disc having relationship characteristics shown in FIG. 1 is adjusted 100 times by a method according to an embodiment of the present invention is indicated by the amounts of changes from an average Pth value and the frequency of such changes;

FIG. 8 shows an example to indicate the variation and frequency of a write power threshold Pth that is determined when the write power is adjusted 100 times by a method according to an embodiment of the present invention in states (a) and (b) in which the modulation variation shown in FIG. 3 occurs on an optical disc having relationship characteristics shown in FIG. 1;

FIG. 9 is a block diagram illustrating the configuration of essential parts of an optical disk drive according to an embodiment of the present invention;

FIG. 10 is a block diagram illustrating a control unit of the optical disk drive according to an embodiment of the present invention;

FIG. 11 is a flowchart illustrating a write power determination method according to an embodiment of the present invention;

FIG. 12 shows a typical relationship between write power Pw and modulation M;

FIG. 13 shows an example in which the relationship between compensated write power (Pw−Pcn) and evaluated value M×(Pw−Pcn) varies in accordance with changes in a write power compensated value Pcn;

FIG. 14 shows typical results that are obtained when the relationship between compensated write power (Pw−PcO) and evaluated value M×(Pw−PcO) is subjected to linear approximation. The figure also indicates a method for calculating compensated write power PthO and write power threshold Pth, which are to be determined.

DETAILED DESCRIPTION OF THE PREFERRED EMBODIMENTS

A write power adjustment method according to embodiments of the present invention will now be described with reference to the accompanying drawings. First of all, the configurations of an optical disc, which is used as an information recording medium, and an optical disc drive, which is used as an information read/write apparatus, will be described. Subsequently, the write power adjustment method for use in the optical disk drive, which serves as the information read/write apparatus, will be described.

First Embodiment

FIG. 9 is a block diagram illustrating the configuration of essential parts of the optical disk drive according to an embodiment of the present invention. An optical disc 10 is CLV (Constant Linear Velocity) controlled or CAV (Constant Angle Velocity) controlled by a spindle motor 12. An optical pickup unit 14 is positioned to face the optical disc 10. When a laser diode (LD) emits laser light 16 having write power, a signal is written on the optical disc. When the LD emits laser light having read power, a written signal is read. Further, if the optical disc 10 is a rewritable optical disc, the LD emits laser light having erasure power (read power<erasure power<write power) to erase a written signal. A signal write is performed by emitting laser light having write power to subject a recording film of the optical disc 10 to an irreversible change and form a pit or by heating and rapidly cooling the recording film, which is crystalline, to make it amorphous. In the present embodiment, both of the above write methods may be used. When the latter method is used, erasure is achieved by emitting laser light having erasure power to change the state of the recording film from amorphous to crystalline.

When a signal is to be written, a write signal is encoded by an encoder 18 and supplied to an LD drive unit 20. In accordance with the encoded write signal, the LD drive unit 20 generates a drive signal and supplies it to the LD in the optical pickup unit 14 to perform a signal write. The write power value for the LD drive unit 20 is determined by a control signal that is fed from a control unit 22. Prior to a signal write, the control unit 22 performs a test write in a test write region of the optical disc 10 at a plurality of different write power levels, and determines an optimum write power level in accordance with the signal quality of the test write.

When, on the other hand, data is to be read, an RF signal is output from the optical pickup unit 14 and supplied to an RF signal processing unit 24. The RF signal processing unit 24, which includes an RF amplifier, an equalizer, a binarization section, and a PLL section, processes the RF signal, and supplies the processed signal to a decoder 26. In accordance with the binarized RF signal and a synchronizing clock reproduced by the PLL section, the decoder 26 decodes the signal and outputs it as read data. A high envelope (Henv)/low envelope (Lenv) acquisition unit 28 amplifies a read signal that is output from the optical pickup unit 14, calculates a high envelope (Henv) and low envelope (Lenv) of the read signal, and supplies the calculation results to the control unit 22 for signal quality evaluation purposes. The read RF signal fed from the RF signal processing unit 24, which is a part of a RF signal acquisition system, is amplified and then supplied to the control unit 22 for signal quality evaluation purposes. When data is to be written and read, a circuit for generating a tracking error signal and focus error signal and providing focus servo control and tracking servo control and a circuit for reading a wobble signal formed on the optical disc 10 and using the wobble signal for address demodulation and rotation speed control are additionally used. However, these circuits will not be described here because they are identical with those provided by a conventional technology.

The control unit 22 determines the optimum write power in accordance with the test-write read signal quality information fed from the RF signal processing unit or Henv/Lenv acquisition unit. In other words, the control unit 22 calculates a modulation M in accordance with the signal fed from the RF signal processing unit or Henv/Lenv acquisition unit, determines the optimum write power Popt in accordance with a write power threshold Pth that provides a modulation of zero with respect to the relationship between a plurality of different write power levels Pwm and associated modulations Mm, and supplies the determined optimum write power Popt to the LD drive unit 20.

FIG. 10 is a block diagram illustrating the configuration of the control unit 22, which is shown in FIG. 9. The control unit 22 comprises a microcomputer. It includes a modulation calculation unit, an optimum write power adjustment/determination unit, a memory, and a parameter memory as functional blocks. The modulation calculation unit and optimum write power adjustment/determination unit may be constituted by a single CPU. The memory and parameter memory may be constituted by a RAM.

The RF signal processing unit or Henv/Lenv acquisition unit supplies a signal to the control unit 22 via an interface (not shown). The supplied signal is then input to the modulation calculation unit. The modulation calculation unit calculates the modulation M from the supplied signal. The calculated modulation Mm is associated with various write power levels Pwm for optimum write power adjustment and stored in the memory. In accordance with the relationship between the stored write power levels Pwm and modulation Mm, the optimum write power adjustment/determination unit determines a write power threshold Pth that provides a modulation of zero and performs a predetermined calculation by using the write power threshold Pth to determine the optimum write power Popt.

The method for determining the write power will now be described in detail with reference to a flowchart. FIG. 11 is a flowchart illustrating processing steps that are performed by the control unit 22 according to the present embodiment.

First of all, the control unit 22 sets a plurality of different write power levels Pwm under predefined conditions. For example, the control unit 22 reads average optimum write power for the optical disc, which is stored beforehand in an optical read/write apparatus, or reproduces and reads average optimum write power that is recorded in a control information region of the optical disc, and performs setup in accordance with the average optimum write power. For example, the control unit 22 reads a plurality of different write power settings Am (m is an integer between 1 and 16) that are stored beforehand in the optical read/write apparatus, uses each write power setting Am to set a plurality of different write power levels Pwm that satisfy the equation Pwm=(average optimum write power)×Am, and writes a predetermined signal pattern, such as an isolated 8T mark having a predetermined length, in the optical disc's test write region by using the write power levels Pwm (step S101).

The test-written region is read to measure the high envelope (Henv) and low envelope (Lenv) of the read signal that correspond to the write power levels Pwm and calculates the modulation Mm that satisfies the equation Mm=(Henv−Lenv)/Henv (step S102). FIG. 12 shows a typical relationship between the modulation Mm and write power Pwm.

Next, a plurality of different write power compensated values Pcn are set under predefined conditions. For example, the average optimum write power for the optical disc, which is stored beforehand in the optical read/write apparatus, is read or the average optimum write power recorded in the control information region of the optical disc is read to perform setup in accordance with the average optimum write power. An alternative would be to read a plurality of different write power compensated value settings Cn (n is an integer between 1 and 16), which are stored beforehand in the optical read/write apparatus, and use the Cn values to set a plurality of different write power levels Pcn that satisfy the equation Pcn=(average optimum write power)×Cn (step S103).

The evaluated value Smn=Mm×(Pwm−Pcn) for each write power compensated value Pcn is calculated, and the write power compensated value Pcn that maximizes the linearity of the relationship between the compensated write power (Pwm−Pcn) and evaluated value Smn is determined as the optimum write power compensated value PcO. For example, the relationship between (Pwm−Pcn) for Pcn and Smn is subjected to linear approximation sequentially from n=1, the sum of squared error Ln of the linear approximation results is calculated, and Pcn that minimizes the sum of squared error Ln is determined as PcO (step S104). FIG. 13 shows typical results that are obtained when the write power compensated value PcO is determined in accordance with the above example. The figure indicates that the linearity of the relationship between (Pwm−Pcn) and Smn increases as Pcn approaches PcO.

Next, the relationship between the compensated write power (Pwm−PcO) for the determined optimum write power compensated value PcO and the evaluated value SmO is subjected to linear approximation as indicated in FIG. 14. The compensated write power PthO that provides a modulation of zero, that is, an evaluated value of zero, is then calculated. Further, the compensated write power PthO and optimum write power compensated value PcO are used to calculate the write power threshold Pth that satisfies the equation Pth=PthO+PcO (step S105).

A predetermined calculation is performed on the calculated write power threshold Pth to determine the optimum write power Popt (step S106). More specifically, the ratio α=Popt/Pth which is stored beforehand in the optical read/write apparatus between the optimum write power Popt for the optical disc and the write power threshold Pth is read or the ratio α=Popt/Pth which is recorded beforehand in the optical disc's control information region between the optimum write power Popt for the optical disc and the write power threshold Pth is reproduced and read to find a solution to the equation Popt=α×Pth.

The ratio α (Popt/Pth) between the optical disc's optimum write power Popt and write power threshold Pth is a value specific to an optical disc or other information recording medium and determined, for instance, for each type of optical disc. The ratio α should be prerecorded on a disc when, for instance, a substrate is produced for disc manufacture. In the case of a BD, for example, the κ value, which is a value specific to a disc, is stored in a wobble section together with address and other information at the time of disc manufacture. Therefore, the value a should also be recorded on a disc. If the information recorded on the disc does not include the value α, the value α may be calculated from relevant information. An alternative is to consider the fact that the value α can be determined for each type of optical disc, predict the α value corresponding to a conceivable type of optical disc (which can exist), and if the associated data is possessed by the optical read/write apparatus, allow the optical read/write apparatus to determine the value α depending on the type of optical disc that needs to be irradiated with light.

The optimum write power Popt determined by the control unit 22 as described above is used to perform a write on the optical disc.

Second Embodiment

A method for setting a plurality of different write power levels Pwm in accordance with the average optimum write power in step S101 is not limited to the method described above in conjunction with the first embodiment. An alternative is to read a write power setup value ΔP for the optical disc, which is stored beforehand in the optical read/write apparatus, or reproduce and read the write power setup value ΔP prerecorded on the optical disc, and use the average optimum write power for the optical disc to set the plurality of different write power levels Pwm that satisfy the equation Pwm=(average optimum write power)−m×ΔP (m is an integer between 1 to 16). Even when setup is performed as described above, the same advantages are provided as in the case of the first embodiment.

Third Embodiment

A method for setting a plurality of different write power levels Pwm in step S101 is not limited to the method described above in conjunction with the first embodiment. An alternative is to read a central setting for the write power Pwm for the disc that is stored beforehand in the optical read/write apparatus, or reproduce and read the central setting for the write power Pwm that is recorded in the optical disc's control information region, and perform setup in accordance with the central setting for the write power Pwm. For example, the write power settings Bm (m is an integer between 1 and 16) for the optical disc that are stored beforehand in the optical read/write apparatus may be read or the write power settings Bm prerecorded in the optical disc's control information region may be reproduced and read. Subsequently, the read Bm values may be used to set the plurality of different write power levels Pwm that satisfy the equation Pwm=(central setting for write power Pwm)×Bm. Even when setup is performed as described above, the same advantages are provided as in the case of the first embodiment.

Fourth Embodiment

A method for setting a plurality of different write power levels Pwm in accordance with the central setting for write power Pwm in step S101 is not limited to the method described above in conjunction with the third embodiment. An alternative is to read the write power setup value $\Delta P$ for the optical disc that is stored beforehand in the optical read/write apparatus, or reproduce and read the write power setup value $\Delta P$ prerecorded on the optical disc, and use the central setting for write power Pwm for the optical disc to set the plurality of different write power levels Pwm that satisfy the equation Pwm=(central setting for write power Pwm)±m×$\Delta P$ (m is an integer that is, for instance, between 0 and 8). Even when setup is performed as described above, the same advantages are provided as in the case of the first embodiment.

Fifth Embodiment

A method for setting a plurality of different write power levels Pwm in step S101 is not limited to the method described above in conjunction with the first embodiment. An alternative is to read a range within which the plurality of different write power levels Pwm for the optical disc that are stored beforehand in the optical read/write apparatus are to be set, or reproduce and read a range within which the plurality of different write power levels Pwm prerecorded in the optical disc's control information region are to be set, and let the optical read/write apparatus arbitrarily set the plurality of different write power levels within the range. Even when setup is performed as described above, the same advantages are provided as in the case of the first embodiment.

Sixth Embodiment

In the first embodiment, predetermined signal patterns are written at various write power levels Pwm in step S101. Alternatively, however, the same signal pattern may be used for all write power levels. Even when setup is performed as described above, the same advantages are provided as in the case of the first embodiment.

Seventh Embodiment

A method for setting a plurality of different write power compensated values Pcn in accordance with the average optimum write power in step S103 is not limited to the method described above in conjunction with the first embodiment. An alternative is to read the ratio I between the optical disc's write power compensated value central setting that is stored beforehand in the optical read/write apparatus and the average optimum write power and the write power setup value $\Delta P$, or reproduce and read the ratio I between the write power compensated value central setting prerecorded on the optical disc and the average optimum write power and the write power setup value $\Delta P$, and use the average optimum write power for the optical disc to set the plurality of different write power compensated values Pcn that satisfy the equation Pcn=(average optimum write power)×I±n×$\Delta P$ (n is an integer that is, for instance, between 0 and 8). Even when setup is performed as described above, the same advantages are provided as in the case of the first embodiment.

Eighth Embodiment

A method for setting a plurality of different write power compensated values Pcn in step S103 is not limited to the method described above in conjunction with the first embodiment. An alternative is to read the central setting for the optical disc's write power compensated values Pcn that is stored beforehand in the optical read/write apparatus, or reproduce and read the central setting for the write power compensated values Pcn that is prerecorded in the optical disc's control information region, and set the plurality of different write power compensated values Pcn in accordance with the central setting for the write power compensated values Pcn. For example, an alternative would be to read the optical disc's write power settings Dn (n is an integer that is, for instance, between 1 and 16) that are stored beforehand in the optical read/write apparatus, or reproduce and read the write power settings Dn prerecorded in the optical disc's control information region, and use the Dn values to set the plurality of different write power compensated values Pcn that satisfy the equation Pcn=(central setting for write power compensated values Pcn)×Dn. Even when setup is performed as described above, the same advantages are provided as in the case of the first embodiment.

Ninth Embodiment

A method for setting a plurality of different write power compensated values Pcn in accordance with the central setting for the write power compensated values Pcn in step S103 is not limited to the method described above in conjunction with the eighth embodiment. An alternative is to read the optical disc's write power setup value $\Delta P$ that is stored beforehand in the optical read/write apparatus, or reproduce and read the write power setup value $\Delta P$ prerecorded on the optical disc, and use the optical disc's central setting for the write power compensated values Pcn to set the plurality of different write power compensated values Pcn that satisfy the equation Pcn=(central setting for write power compensated values Pcn)±n×$\Delta P$ (n is an integer that is, for instance, between 0 and 8). Even when setup is performed as described above, the same advantages are provided as in the case of the first embodiment.

Tenth Embodiment

A method for setting a plurality of different write power compensated values Pcn in step S103 is not limited to the method described above in conjunction with the first embodiment. An alternative is to read a plurality of different write power compensated values Pcn (n is an integer that is, for instance, between 1 and 16) for the optical disc that are stored beforehand in the optical read/write apparatus, or reproduce and read the write power compensated values Pcn prerecorded in the optical disc's control information region, and set the plurality of different write power compensated values Pcn. Even when setup is performed as described above, the same advantages are provided as in the case of the first embodiment.

Eleventh Embodiment

A method for setting a plurality of different write power compensated values Pcn in step S103 is not limited to the method described above in conjunction with the first embodiment. An alternative is to read a range within which the plurality of different write power compensated values Pcn for the optical disc that are stored beforehand in the optical read/write apparatus are to be set, or reproduce and read a range within which the plurality of different write power compensated values Pcn prerecorded in the optical disc's control information region are to be set, and let the optical read/write apparatus arbitrarily set the plurality of different write power compensated values Pcn within the range. Even when setup is performed as described above, the same advantages are provided as in the case of the first embodiment.

Twelfth Embodiment

A method for calculating the optimum write power Popt in step S106 is not limited to the method described above in conjunction with the first embodiment. An alternative is to read the ratio $Popt/Pth=\kappa \times \rho$ between the optical disc's optimum write power Popt determined by the conventional $\kappa$ method and the write power threshold Pth, which is prerecorded in the optical disc's control information region, read a compensated value $\alpha'$, which is stored beforehand in the optical read/write apparatus, and use $\kappa \times \rho$ and $\alpha'$ to calculate the optimum write power Popt that satisfies the equation $Popt=\alpha' \times (\kappa \times \rho) \times Pth$. Even when setup is performed as described above, the same advantages are provided as in the case of the first embodiment.

The present invention may be embodied in other specific forms without departing from the spirit or essential characteristics thereof. The embodiments described above are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A write power adjustment method that is used to test-write a signal onto an information recording medium at a plurality of different power levels and adjust write power in accordance with read signal quality of the signal when the information recording medium is irradiated with light to write information onto the information recording medium and/or read information from the information recording medium, the write power adjustment method comprising the steps of:

determining a modulation Mm from a read signal amplitude of the signal that is test-written at the plurality of different levels of write power Pwm;

setting a write power compensated value Pcn;

determining an evaluated value $Smn=Mm \times (Pwm-Pcn)$ from the modulation Mm and compensated write power (Pwm−Pcn), which is obtained from the write power compensated value Pcn and the write power Pwm;

determining an optimum write power compensated value PcO in accordance with the relationship between the compensated write power (Pwm−Pcn) and the evaluated value Smn;

determining compensated write power PthO that provides an evaluated value SmO of zero when the relationship between compensated write power (Pwm−PcO) for the optimum write power compensated value PcO and the evaluated value SmO is subjected to linear approximation;

determining a write power threshold Pth by using the compensated write power PthO and the optimum write power compensated value PcO; and determining optimum write power Popt in accordance with the write power threshold Pth.

2. The write power adjustment method according to claim 1, wherein the step of determining the optimum write power compensated value PcO includes the steps of:

determining the relationship between the compensated write power (Pwm−Pcn) and the evaluated value Smn; and determining the write power compensated value Pcn that maximizes the linearity of the relationship, as an optimum write compensated value PcO.

3. The write power adjustment method according to claim 1, wherein the step of determining the optimum write power Popt includes the step of:

calculating the optimum write power Popt by using the write power threshold Pth and the ratio $\alpha$ which is set for each information recording medium between the optimum write power Popt and the write power threshold Pth.

4. The write power adjustment method according to claim 3, wherein the ratio $\alpha$ between the optimum write power Popt and the write power threshold Pth is derived from control information that is written on an information recording medium.

5. A write power adjustment method that is used to test-write a signal onto an information recording medium at a plurality of different power levels and adjust write power in accordance with read signal quality of the signal when the information recording medium is irradiated with light to write information onto the information recording medium and/or read information from the information recording medium, the write power adjustment method comprising the steps of:

determining an optimum write power compensated value PcO by using write power Pwm, a write power compensated value Pcn, and an evaluated value Smn derived from a modulation Mm;

determining a write power threshold Pth from the relationship to current compensated write power PthO; and determining the optimum write power Popt by using the ratio $\alpha$ written on the information recording medium between optimum write power Popt and the write power threshold Pth.

6. The write power adjustment method according to claim 5, wherein the relationship between compensated write power (Pwm−Pcn), which is the difference between the write power Pwm and the write power compensated value Pcn, and the evaluated value Smn is examined to determine the optimum write power compensated value PcO from the write power compensated value Pcn that maximizes the linearity of the relationship.

7. The write power adjustment method according to claim 5, wherein the ratio α between the optimum write power Popt and the write power threshold Pth is set for each information recording medium and prerecorded on each information recording medium.

8. The write power adjustment method according to claim 5, wherein the ratio α between the optimum write power Popt and the write power threshold Pth is used as a predetermined value without regard to the information recording medium.

9. An optical read/write apparatus that irradiates an information recording medium with light to write information onto the information recording medium and/or read information from the information recording medium, the optical read/write apparatus comprising:
 a write power adjustment section configured to adjust write power that is used when information is to be written onto at least the information recording medium,
 wherein the write power adjustment section includes
 a section configured to determine a modulation Mm from a read signal amplitude of a signal that is test-written at a plurality of different levels of write power Pwm,
 a section configured to determine an evaluated value Smn=Mm×(Pwm−Pcn) from the modulation Mm and compensated write power (Pwm−Pcn), which is obtained from the write power compensated value Pcn and the write power Pwm,
 a section configured to determine an optimum write power compensated value PcO in accordance with the relationship between the compensated write power (Pwm−Pcn) and the evaluated value Smn,
 a section configured to determine compensated write power PthO that provides an evaluated value SmO of zero when the relationship between compensated write power (Pwm−PcO) for the optimum write power compensated value PcO and the evaluated value SmO is subjected to linear approximation,
 a section configured to determine a write power threshold Pth by using the compensated write power PthO and the optimum write power compensated value PcO, and
 a section configured to determine optimum write power Popt in accordance with the write power threshold Pth.

10. The optical read/write apparatus according to claim 9, wherein the section configured to determine the optimum write power compensated value PcO includes:
 a section configured to determine the relationship between the compensated write power (Pwm−Pcn) and the evaluated value Smn; and
 a section configured to determine the write power compensated value Pcn that maximizes the linearity of the relationship, as an optimum write compensated value PcO.

11. The optical read/write apparatus according to claim 9, wherein the section configured to determine the optimum write power Popt includes:
 a section configured to determine the write power threshold Pth and the ratio α between the write power threshold Pth and the optimum write power Popt, which is set for each information recording medium.

12. The optical read/write apparatus according to claim 11, wherein the section configured to determine the optimum write power Popt determines the optimum write power Popt from α×Pth by using the ratio α determined by the section configured to determine the ratio α.

13. The optical read/write apparatus according to claim 12, wherein the ratio α between the optimum write power Popt and the write power threshold Pth is determined by acquiring control information that is written on an information recording medium.

14. The optical read/write apparatus according to claim 11, wherein the section configured to determine the ratio α determines the ratio α by selecting a desired ratio from a plurality of ratios related to a plurality of information recording media.

15. The optical read/write apparatus according to claim 14, wherein the plurality of ratios are preset.

* * * * *